(12) United States Patent
Schaefer et al.

(10) Patent No.: US 10,390,616 B2
(45) Date of Patent: Aug. 27, 2019

(54) PRODUCT DISPLAY ASSEMBLY AND METHOD

(71) Applicant: iSee Store Innovations, LLC, St. Louis, MO (US)

(72) Inventors: Mark Schaefer, Town and Country, MO (US); Steven Allen Brenner, Clayton, MO (US)

(73) Assignee: iSee Store Innovations, LLC, St. Louis, MO (US)

( * ) Notice: Subject to any disclaimer, the term of this patent is extended or adjusted under 35 U.S.C. 154(b) by 10 days.

(21) Appl. No.: 15/710,445

(22) Filed: Sep. 20, 2017

(65) Prior Publication Data

US 2019/0082830 A1 Mar. 21, 2019

(51) Int. Cl.
*F25D 3/08* (2006.01)
*A47G 23/02* (2006.01)
*A47B 73/00* (2006.01)
*B23P 19/04* (2006.01)
*A47F 7/00* (2006.01)

(52) U.S. Cl.
CPC ............ *A47B 73/00* (2013.01); *A47F 7/0071* (2013.01); *B23P 19/04* (2013.01)

(58) Field of Classification Search
CPC ......... A47F 7/0071; A47F 7/283; A47B 73/00
See application file for complete search history.

(56) References Cited

U.S. PATENT DOCUMENTS

| | | | |
|---|---|---|---|
| 1,017,102 A | | 5/1911 | Kaufman |
| 1,211,269 A | * | 1/1917 | Abbott ....................... A47F 5/13 211/41.2 |
| 1,514,313 A | * | 11/1924 | Davenport ............... A47J 47/16 248/167 |
| 1,642,231 A | * | 9/1927 | Dover .................... A47G 33/12 248/167 |
| 2,028,640 A | | 1/1936 | Zaiger |
| 2,142,826 A | * | 1/1939 | Rosello ...................... G09F 1/14 206/102 |
| 2,501,772 A | * | 3/1950 | Guard ................... F25D 31/007 206/162 |
| 2,552,921 A | * | 5/1951 | Anderson ................ G10G 5/00 248/167 |

(Continued)

FOREIGN PATENT DOCUMENTS

JP 2012225445 11/2012

OTHER PUBLICATIONS

International Search Report for counterpart PCT/US/2015/017018 dated Jul. 23, 2015.

*Primary Examiner* — Kimberley S Wright
(74) *Attorney, Agent, or Firm* — Joseph M. Butscher; The Small Patent Law Group, LLC (57) ABSTRACT

A product display assembly includes a body, at least one support, and at least one product holder. The body defines an interior volume and includes a base. The at least one support is mounted to the base of the body, and disposed within the interior volume. The support includes a foot and a stem extending from the foot. The foot is mounted to the base of the body and defines a foot plane, and the stem extends from the foot at an oblique angle to the foot plane. The at least one product holder is mounted to the at least one support, and is configured to hold a product at an orientation that is oblique to the foot plane.

18 Claims, 10 Drawing Sheets

(56) References Cited

U.S. PATENT DOCUMENTS

| | | | | |
|---|---|---|---|---|
| 3,094,219 A * | 6/1963 | Klein | ................... | A47F 7/283 211/77 |
| 3,107,007 A * | 10/1963 | Klein | ................... | B65D 25/10 206/526 |
| 4,133,575 A | 1/1979 | Mader | | |
| D270,985 S * | 10/1983 | Hill | ................... | D7/608 |
| 4,610,363 A * | 9/1986 | Flum | ................... | A47F 5/112 211/72 |
| 4,688,684 A * | 8/1987 | Young | ................... | A47F 7/281 108/106 |
| 4,768,530 A * | 9/1988 | Vaughn | ................... | A45D 27/22 132/289 |
| 4,915,239 A * | 4/1990 | Persch | ................... | A47G 23/025 211/74 |
| 4,984,693 A | 1/1991 | Belokin | | |
| 4,991,807 A | 2/1991 | Radnich | | |
| 5,096,272 A | 3/1992 | Belokin | | |
| 5,104,077 A | 4/1992 | Liu | | |
| 5,180,066 A * | 1/1993 | McArdle | ................... | A47F 7/28 211/73 |
| 5,188,325 A | 2/1993 | Hilty | | |
| 5,242,063 A | 9/1993 | Ericksen | | |
| 5,330,261 A | 7/1994 | Bennett | | |
| 5,351,841 A | 10/1994 | Belokin | | |
| 5,358,128 A | 10/1994 | Belokin | | |
| 5,486,044 A | 1/1996 | Bennett | | |
| 5,582,302 A * | 12/1996 | Kozak | ................... | A47F 5/0031 211/181.1 |
| 5,624,043 A * | 4/1997 | Baptista | ................... | A47G 23/0241 211/60.1 |
| 5,743,415 A | 4/1998 | Smart | | |
| 5,826,731 A * | 10/1998 | Dardashti | ................... | A47B 73/002 211/74 |
| 5,852,250 A * | 12/1998 | Cha | ................... | G10G 5/00 84/327 |
| 5,915,573 A | 6/1999 | Drower | | |
| 5,921,403 A | 7/1999 | Coffaro | | |
| 6,003,692 A * | 12/1999 | Kozak | ................... | A47F 5/0031 211/128.1 |
| 6,003,693 A * | 12/1999 | Blickenstaff | ................... | A47G 23/0241 211/74 |
| RE36,827 E | 8/2000 | Belokin | | |
| 6,123,299 A | 9/2000 | Zach | | |
| D439,615 S * | 3/2001 | Sloniawski | ................... | D19/62 |
| 6,351,964 B1 * | 3/2002 | Brancheau | ................... | A47F 3/0408 211/59.2 |
| 6,360,558 B1 * | 3/2002 | Woog | ................... | A45C 11/20 206/141 |
| 6,478,271 B1 | 11/2002 | Mulholland | | |
| 6,481,014 B1 * | 11/2002 | Banks | ................... | F25D 3/08 220/592.17 |
| 6,488,256 B1 | 12/2002 | Wen-Chi | | |
| 6,502,794 B1 | 1/2003 | Ting | | |
| 6,571,967 B2 | 6/2003 | Belokin | | |
| 6,637,707 B1 | 10/2003 | Gates | | |
| 6,669,033 B1 | 12/2003 | Lian | | |
| D510,015 S | 9/2005 | Hostetler | | |
| 7,059,482 B2 | 6/2006 | Reid | | |
| 7,080,744 B2 | 7/2006 | Robertson | | |
| 7,121,112 B2 * | 10/2006 | Robertson | ................... | A47F 3/0443 62/457.5 |
| 7,156,353 B2 * | 1/2007 | Kringel | ................... | A47F 7/283 215/399 |
| 7,850,133 B2 | 12/2010 | Carnevali | | |
| 7,882,706 B2 * | 2/2011 | Thali | ................... | F25C 1/22 249/119 |
| 8,197,149 B2 | 6/2012 | Darrow | | |
| 8,256,834 B2 * | 9/2012 | Linder | ................... | A47F 3/142 297/129 |
| D685,971 S * | 7/2013 | Thibault | ................... | D32/54 |
| 8,474,616 B2 * | 7/2013 | Farid | ................... | A47F 7/0071 206/423 |
| 8,608,015 B2 * | 12/2013 | Wolf | ................... | F25D 3/08 220/507 |
| 8,807,501 B2 | 8/2014 | Chung | | |
| 8,931,649 B2 * | 1/2015 | Chen | ................... | A47F 5/13 211/181.1 |
| 9,410,571 B2 | 8/2016 | Yang | | |
| 2002/0121456 A1 * | 9/2002 | Mannion | ................... | A47F 5/04 211/113 |
| 2003/0080078 A1 | 5/2003 | Belokin | | |
| 2003/0160060 A1 | 8/2003 | Hornblad | | |
| 2003/0209505 A1 | 11/2003 | Belokin | | |
| 2003/0222037 A1 | 12/2003 | Belokin | | |
| 2004/0099624 A1 | 5/2004 | Hein | | |
| 2006/0043036 A1 | 3/2006 | Robertson | | |
| 2006/0060549 A1 | 3/2006 | Robertson | | |
| 2006/0168993 A1 * | 8/2006 | Robertson | ................... | A47F 3/0443 62/457.5 |
| 2006/0202096 A1 * | 9/2006 | Mazzola | ................... | A47F 7/283 248/316.7 |
| 2007/0152120 A1 | 7/2007 | Hostetler | | |
| 2008/0006592 A1 | 1/2008 | Brooks | | |
| 2008/0283697 A1 | 11/2008 | Darrow | | |
| 2008/0308693 A1 | 12/2008 | Kim | | |
| 2009/0223849 A1 * | 9/2009 | Farid | ................... | A47F 7/0071 206/423 |
| 2009/0224117 A1 | 9/2009 | Kaneda | | |
| 2009/0266779 A1 | 10/2009 | Cresswell | | |
| 2010/0148025 A1 | 6/2010 | Belokin | | |
| 2010/0326857 A1 * | 12/2010 | Abood | ................... | B65D 25/108 206/427 |
| 2011/0220599 A1 * | 9/2011 | Siahpush | ................... | A47F 5/02 211/85.4 |
| 2011/0252824 A1 * | 10/2011 | Dallas | ................... | B65D 1/26 62/457.5 |
| 2015/0208840 A1 * | 7/2015 | Honeycutt | ................... | A47F 19/30 414/800 |
| 2017/0008659 A1 * | 1/2017 | Brewster | ................... | A47F 7/283 |

* cited by examiner

PRODUCT DISPLAY ASSEMBLY AND METHOD

FIELD OF THE DISCLOSURE

Embodiments of the present disclosure generally relate to systems and methods for displaying products, such as beverage containers.

BACKGROUND OF THE DISCLOSURE

Various commercial enterprises offer beverages for sale in containers. Often, the amount of shelving or display space is limited. Conventionally, beverage containers may be displayed using racks. However, currently known racks may suffer from one or more of difficulty or inefficiency of assembly, un-realistic or un-interesting display presentations, and/or lack of flexibility of use with differently sized shelving environments or mounting environments.

SUMMARY OF THE DISCLOSURE

A need exists for a system and/or method of conveniently and reliably displaying products such as beverage containers.

Accordingly, certain embodiments of the present disclosure provide a product display assembly that is configured to display beverage containers. The product display assembly includes a body, at least one support, and at least one product holder. The body defines an interior volume and includes a base. The at least one support is mounted to the base of the body, and disposed within the interior volume. The support includes a foot and a stem extending from the foot. The foot is mounted to the base of the body and defines a foot plane, and the stem extends from the foot at an oblique angle to the foot plane. The at least one product holder is mounted to the at least one support, and is configured to hold a product at an orientation that is oblique to the foot plane.

Certain embodiments of the present disclosure provide a product display assembly configured to display beverage containers. The product display assembly includes a support and a product holder. The support is configured to be mounted within an internal volume of a body. The support includes a foot and a stem extending from the foot. The foot defines a foot plane, and the stem extends from the foot at an oblique angle to the foot plane. The product holder is removably mounted to the stem, and is configured to hold a product at an orientation that is oblique to the foot plane.

Certain embodiments of the present disclosure provide a method of providing a product display assembly configured to display beverage containers. The method includes providing a body defining an interior volume. The body includes a base. The method also includes mounting at least one support to the base of the body. The support is disposed within the interior volume. The support includes a foot and a stem extending from the foot. The foot defines a foot plane, and the stem extends from the foot at an oblique angle to the foot plane. Further, the method includes mounting at least one product holder to the at least one support. The product holder is configured to hold a product at an orientation that is oblique to the foot plane.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide a product display assembly that provides a realistic presentation of the product. For example, the actual product being advertised is used in conjunction with the display (e.g., by placing an actual product such as a beverage container in a holder of a product display assembly). Use of the actual product provides for improved realism of the display, as well as for improved product identification. In various embodiments, beverage containers may be displayed at a variety of orientations and/or elevations to further enhance the realism of the display. In some embodiments, a container may also provide the size or other appearance of a container used in connection with a product (e.g., a display may utilize a body that has the same size and general appearance of a bucket used to hold beverage containers). Various embodiments also provide for convenient mounting on smooth surfaces (such as a backbar or other smooth glass surface) as well as non-smooth surfaces. Various embodiments also provide a flat panel for improved labelling (e.g., with product logos).

Figure 1:
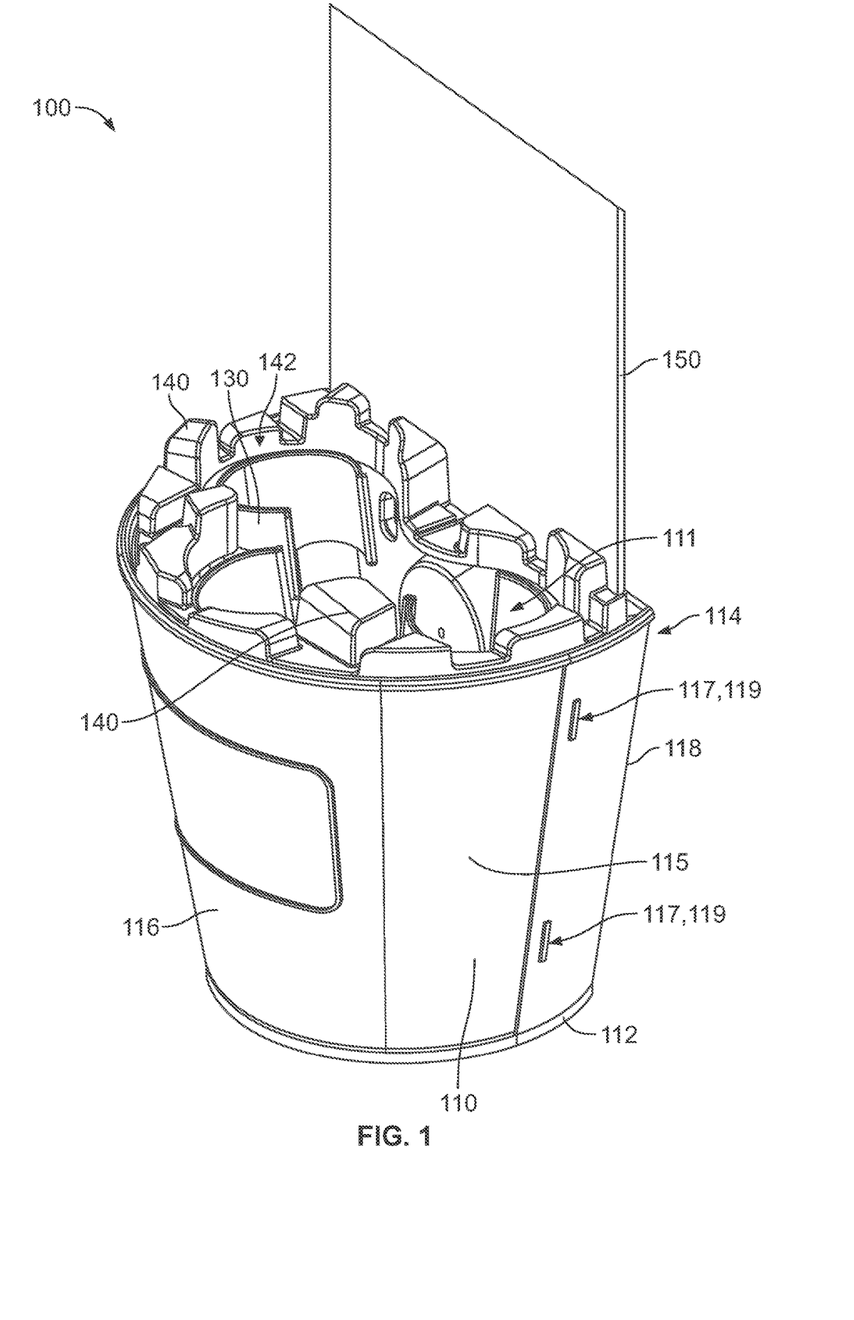
FIG. 1 illustrates a perspective front view of a product display assembly, according to an embodiment of the present disclosure.
Figure 2:
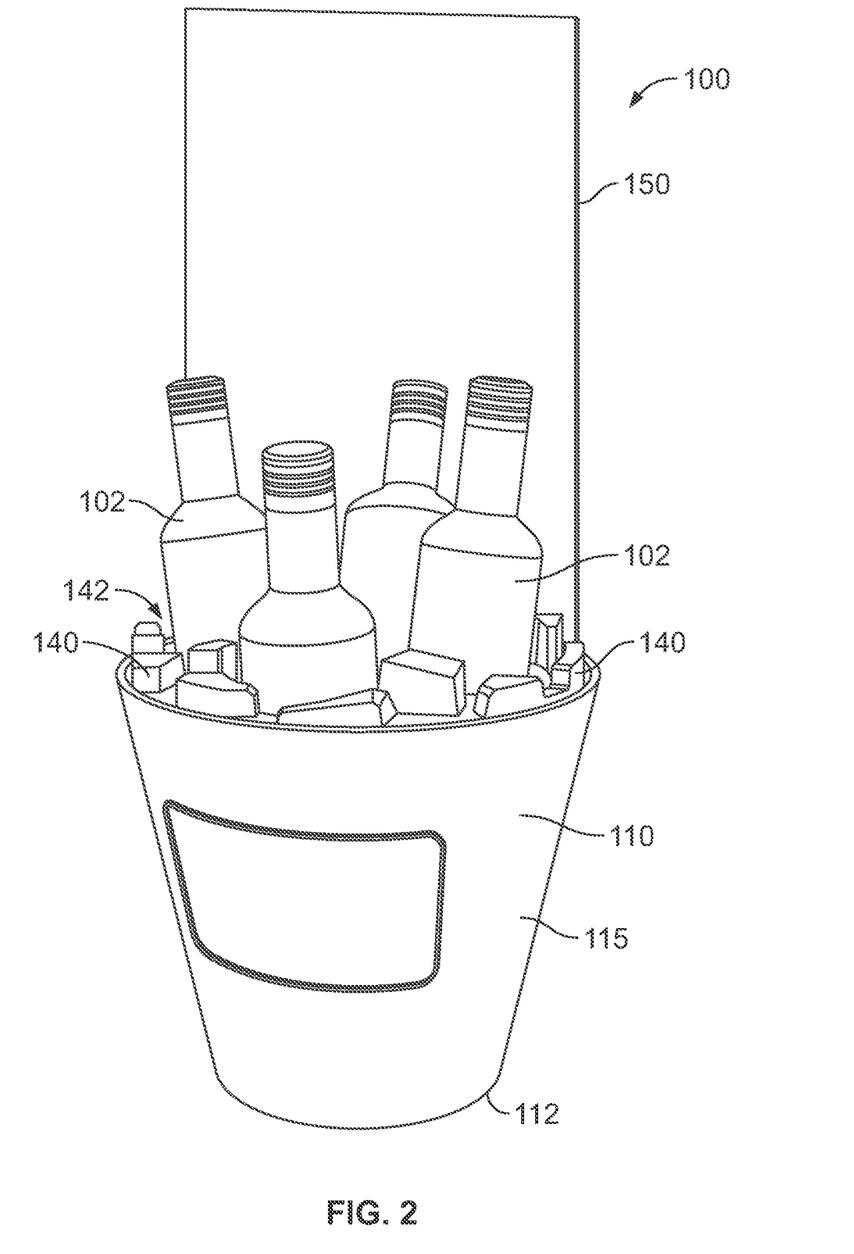
FIG. 2 illustrates a perspective front view of the product display assembly of FIG. 1 with beverage containers in place.
Figure 3:
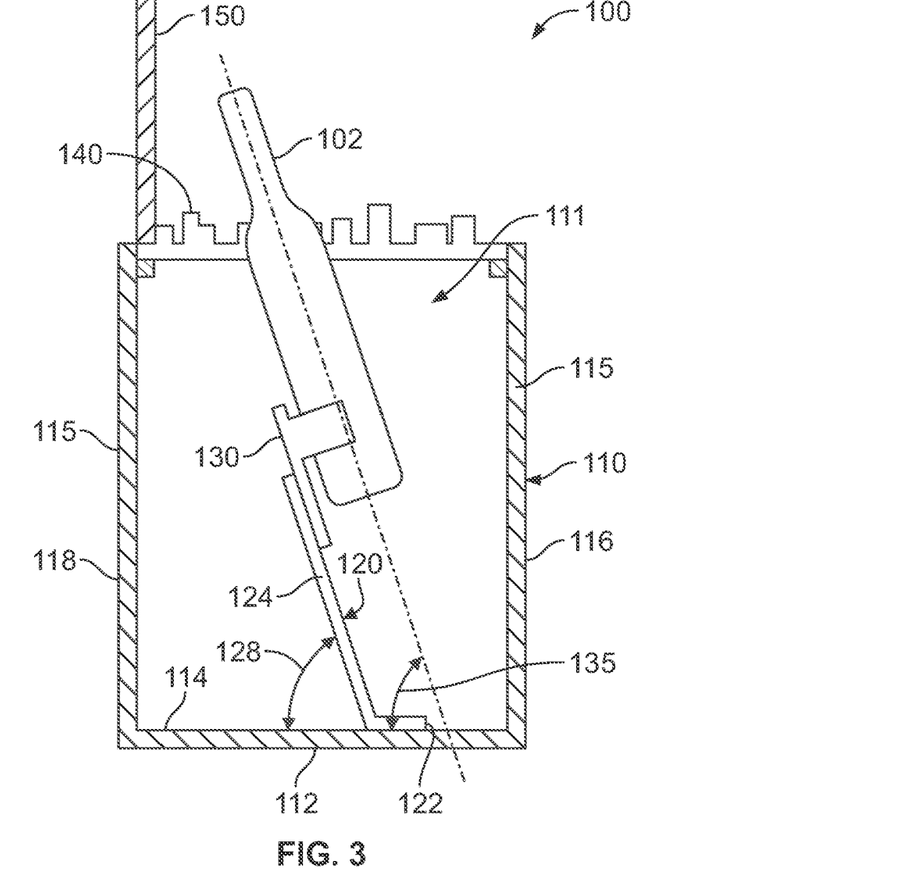
FIG. 3 illustrates a side sectional view of aspects of the product display assembly of FIG. 1 with a beverage container in place.

FIG. 1 illustrates a perspective front view of a product display assembly 100, according to an embodiment of the present disclosure. FIG. 2 illustrates a perspective front view of the product display 100 with beverage containers 102 positioned in the product display assembly 100, and FIG. 3 illustrates a side sectional view of aspects of the product display 100. As seen in FIGS. 2-3, the product display assembly is configured to display beverage containers 102. As seen in FIGS. 1-3, the depicted product display assembly 100 includes a body 110, supports 120, and product holders 130. While three supports 120 and corresponding product holders 130 are shown in FIGS. 1-2, more or fewer supports 120 and product holders 130 may be employed in other embodiments. For example, a single support 120 and corresponding product holder 130 may be used in other embodiments. Generally, the supports 120 are mounted to the body 110, with the product holders 130 mounted to the supports 120. The product holders 130 are configured to hold the beverage containers 102 in a desired position for display purposes. The depicted product display assembly 100 provides for convenient placement of the beverage containers 120, and, as discussed herein, may be used to display the beverage containers 120 at different elevations and/or angular orientations, for example, to realistically simulate the appearance of the beverage containers 102 in a bucket or other container.

As seen in FIGS. 1-3, the body 110 defines an interior volume 111. The body 110 includes a base 112 and sides 115 extending upward from the base 112. In the depicted embodiment, the base 112 is generally flat, and the sides 115 extend upward from the base 112 at the edges of the base 112 to define the interior volume 111. With the base 112 located at the bottom of the body 110 as seen in FIGS. 1-3, the top of the body 110 is open to a surrounding atmosphere, with the interior volume 111 defined between the sides 115. In the illustrated embodiment, the body 110 is shaped in a truncated bucket shape, with the sides 115, when viewed from the top, defining a truncated circle. Other shapes may be used in alternated embodiments. The body 110 in various embodiments is formed from a molded plastic. The body 110 may be formed in one piece or monolithically, or, alternatively, may be formed from two or more pieces for manufacturing and/or shipping convenience. For example, multiple pieces may be used to form the sides 115. In the illustrated embodiment, the body 110 includes a front portion 116 that is joined to a rear portion 118. The base 112 may be formed with the rear portion 118 (or, alternatively, formed with the front portion 116), for example, or may be formed separately from the front portion 116 and rear portion 118. As another example, the sides 115 may be formed from a single piece, with the base 112 formed from a separate piece that is joined to the sides 112 to form the body 110. Various portions of the body 110 may be joined in a permanent fashion (e.g., gluing or welding), or, alternatively may be temporarily or removably joined together (e.g., via a snapping connection between tabs and slots, or via the use of fasteners). It may be noted that the depicted embodiment is assembled using separate pieces, and may be assembled at or near a point of display, and/or may be assembled remotely at a different location. Accordingly, in various embodiments the product display assembly 100 may be provided as a kit, with various components provided in an un-assembled or partially assembled state. For example, the various aspects of product display assembly 100 may be manufactured (e.g., molded from a plastic), shipped to a second location (e.g., retail store or point of sale) in an unassembled condition, and assembled and used at the second location. As another example, the product display assembly 100 may be assembled at the second location, and then transported to a third location for use.

The supports 120 are mounted to the base 112 of the body. In some embodiments, the supports 120 may be permanently joined to the base 112 and/or monolithically formed with the base 112, while in other embodiments, the supports 120 may be removably mounted to the base 112. The supports 120 are disposed within the interior volume 111 of the body 110 when mounted to the base 112. In the illustrated embodiment, the supports 120 are removably mounted to the base 112, disposed entirely within the interior volume 111, and not visible to a viewer when the body 110 is viewed from the side. It may be noted that the supports 112 may be mounted to a flat surface extending along an upper portion of the base 110. In other embodiments, the base 110 may include pads or other structures to which the supports 120 are mounted.

Figure 4:
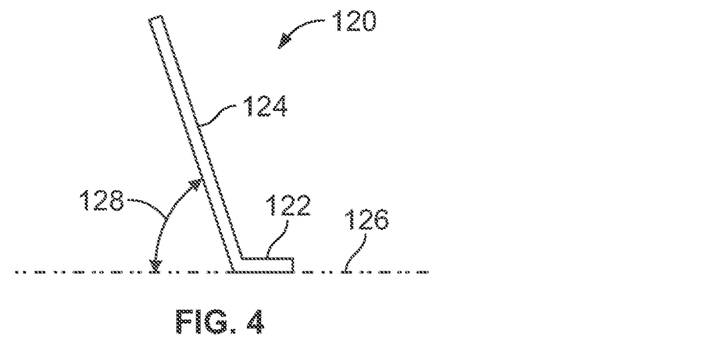
FIG. 4 illustrates a side view of a support and product holder, according to an embodiment of the present disclosure.
Figure 5:
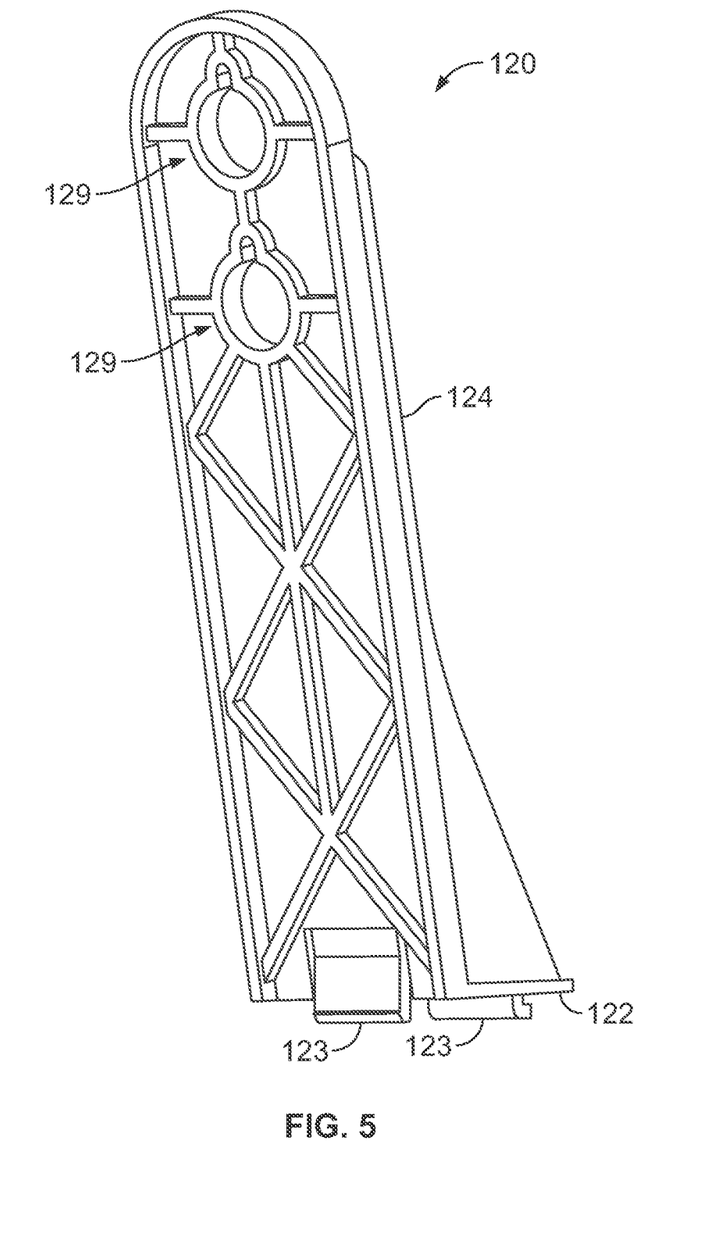
FIG. 5 illustrates a perspective view of the support of FIG. 4.

FIG. 3 depicts a side sectional view showing a support 120 mounted to the base 112, FIG. 4 provides a side view of the support 120, and FIG. 5 provides a perspective view of the support 120. As seen in FIGS. 3-5, the support 120 includes a foot 122 and a stem 124. The foot 122 is mounted to the base 112 of the body 110, and the stem 124 extends from the foot 122. As seen in FIG. 3, the foot 122 is mounted to the base 112 of the body 110. As seen in FIGS. 3 and 4, the foot 122 defines a foot plane 126. In the illustrated embodiment, the foot plane 126 extends along the top surface 114 of the base 112. The stem 124 extends from the foot 122 at an oblique angle to the foot plane 126. As used herein, an oblique angle to the foot plane 126 may be understood as an angle that is neither parallel nor perpendicular to the foot plane 126.

In the illustrated embodiment, the stem 124 extends from the foot plane 126 at a stem angle 128, with the stem angle 128 defined between the foot plane 126 and a surface of the stem 124 configured to support the product holder 130. As discussed herein, the stem angle 128 is an oblique angle with respect to the foot plane. In various embodiments, the stem angle 128 may be between 60 degrees and 85 degrees. For example, the stem angle 128 may be 75 degrees. It may be noted that in embodiments with multiple supports 120, some or all of the supports 120 may have stem angles 128 that differ from the stem angle 128 of other supports 120. In the illustrated embodiment, as the foot plane 126 runs along the top surface 114 of the base 112 and the stem angle 128 is oblique to the foot plane 126, the stem angle 128 is also oblique to the base 112 (e.g., at an oblique angle to the top surface 114 of the base 112). Use of a stem angle 128 that is oblique to the base 112 may be used to secure a beverage container 102 at an angle that extends obliquely from the base 112 for a more realistic appearance. For example, one or more bottles may extend at various oblique angles out of the top of the body 112, appearing more realistic than if the bottles all extended vertically from the base and the body.

Figure 6:
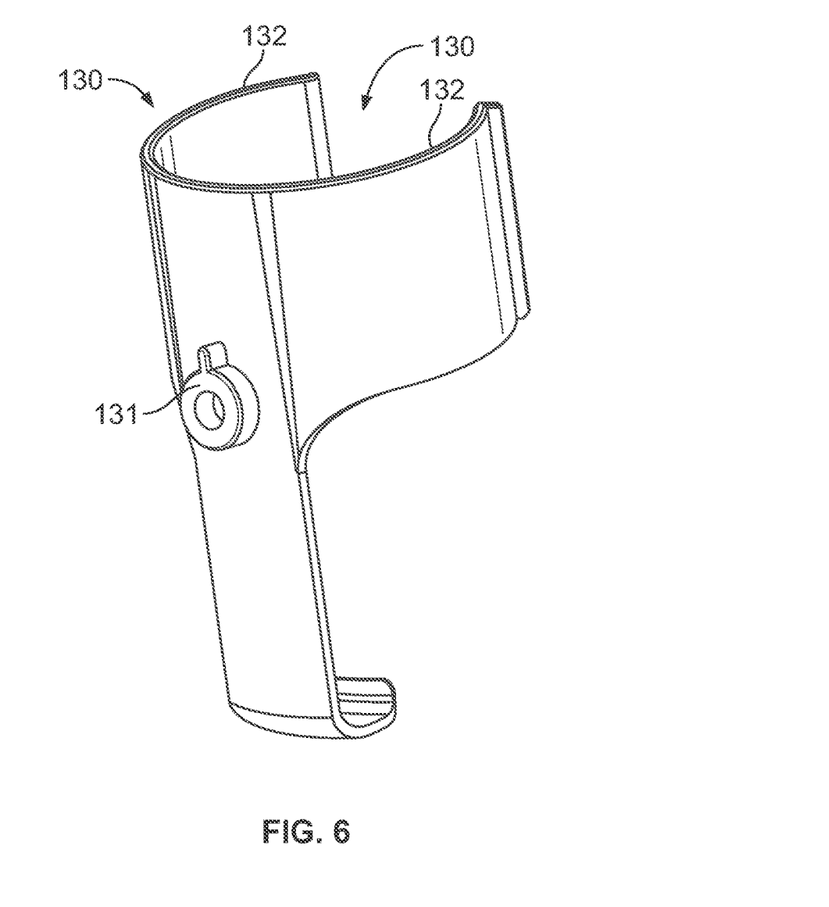
FIG. 6 illustrates a perspective view of a product holder, according to an embodiment of the present disclosure.
Figure 7:
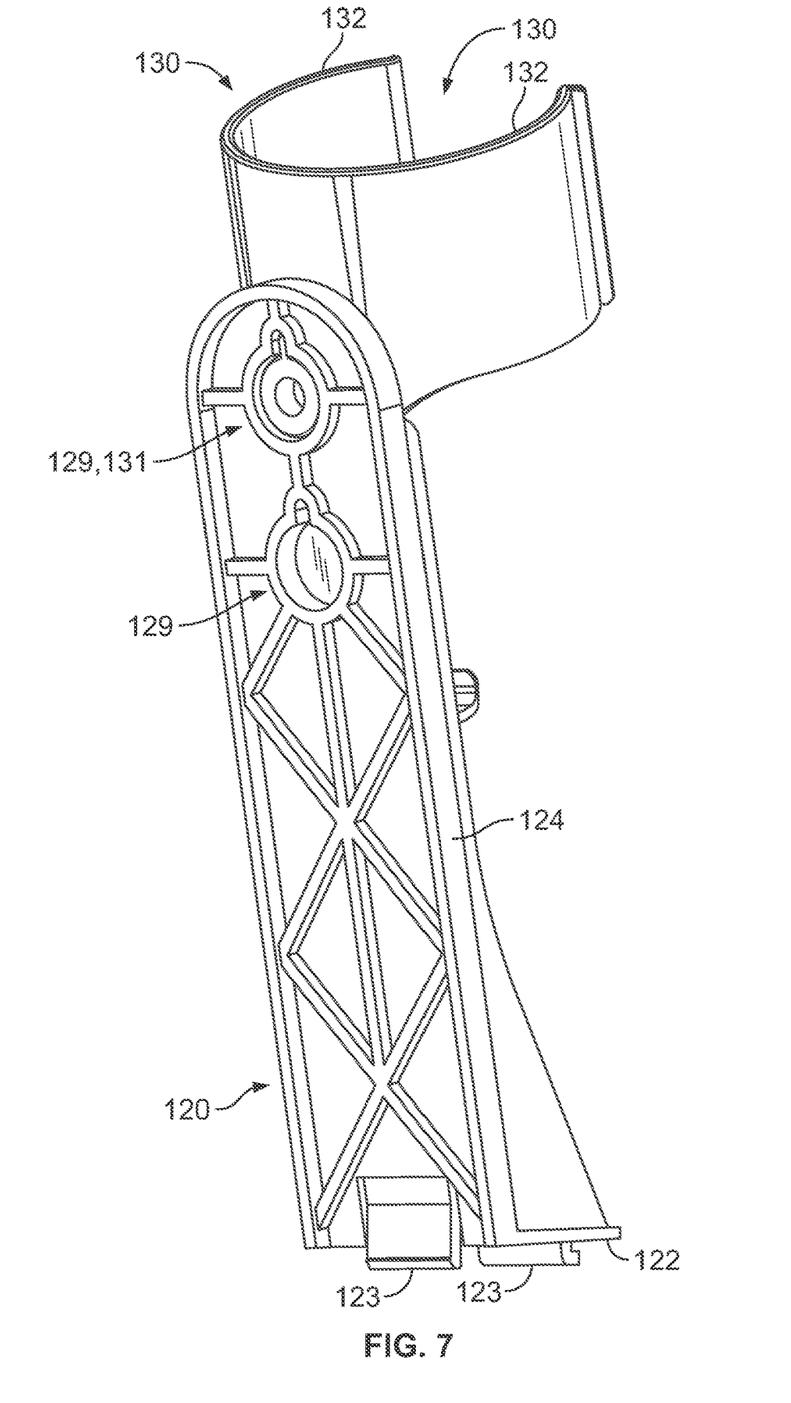
FIG. 7 illustrates a perspective view of the product holder of FIG. 6 mounted to the support of FIGS. 4 and 5.

The depicted product holders 130 are configured to hold beverage containers 102. FIG. 6 illustrates a perspective view of an individual product holder 130, and FIG. 7 illustrates a perspective view of the product holder 130 mounted to a support 120. As seen in FIGS. 6 and 7, the product holder 130 may be mounted to the stem 124 of the support 120. Each product holder 130 is configured to hold a product (e.g., beverage container 102) at an orientation that is oblique to the foot plane 126 of the support 120 (and, in the illustrated embodiment, oblique to the base 112 of the body 110. In various embodiments, a product holder 130 may be made of plastic with resilient sides 132, and configured to grasp or secure a beverage container 102 in place within the product holder 130 at different points along the height of beverage container 102. Accordingly, the elevation of one or more beverage containers 102 may be varied within a display. Additionally, in some embodiments, the product holder 130 is configured to grasp different types of beverage container 102 (e.g., long neck bottle, 16 ounce can). For example, the sides 132 may be sized to resiliently accept two or more different types of beverage containers. For example, the product holder 130 may be disposed within the interior volume 111 and out of view from an observer viewing the product display assembly 100 from the side, with the beverage container 102 positioned such that a portion of the beverage container extends from the interior volume 111 and is visible to the observer. Additional details regarding product holders may be found in U.S. patent application Ser. No. 14/623,679, filed Feb. 17, 2015, the subject matter of which is hereby incorporated by reference in its entirety.

Figure 8:
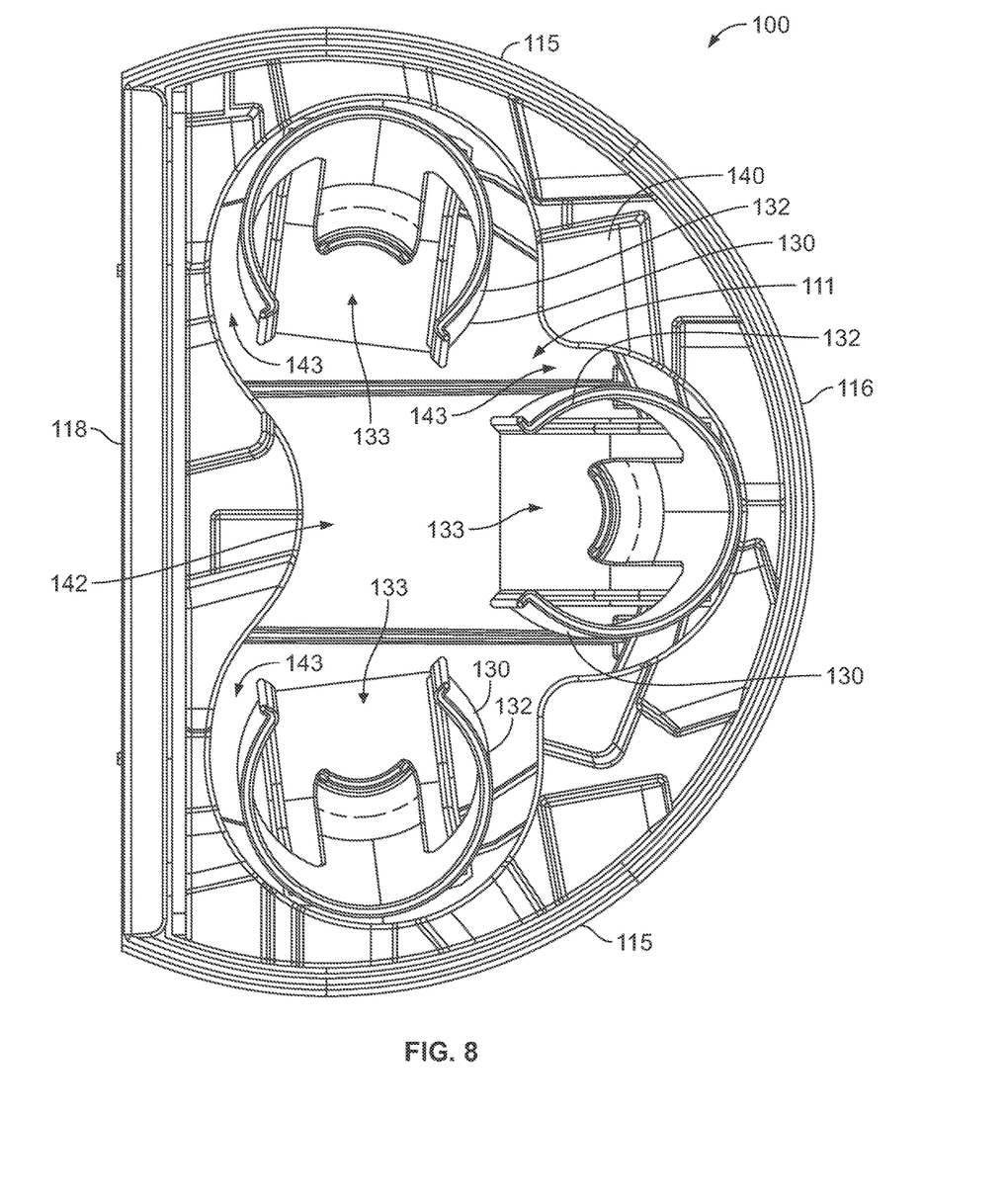
FIG. 8 illustrates a top view of the product display assembly of FIG. 1.

FIG. 8 illustrates a top view of the product display assembly of FIG. 1. As seen in FIG. 8, the depicted supports 120 are oriented (e.g., by tabs secured in slots) so that openings 133 (openings configured to accept the beverage containers 102) of the product holders 130 between the sides 132 of the product holders 130 face toward a center of the interior volume 111. Accordingly, multiple supports 120 are mounted to the base in different orientations, allowing for a variety of product display options. Further, in some embodiments, the stem angles 128 or product angles 135 (for an example product angle 135, see FIG. 3) for different supports 120 are not parallel and/or are oriented in different directions (e.g., one to the left and one to the right and one toward the front of the body 110), allowing for variety in product positioning.

For example, with reference to FIGS. 4-7, each support 120 may define a stem angle 128 extending from the foot plane 126. At least two of the supports 120 of a given product display assembly may have different stem angles 128. For example, with the supports 120 mounted to a flat portion of the base 112, the stem angles 128 define a product angle 135. For example, the supports 120 and product holders 135 may be configured such that the at least one product holder 130 defines a product angle 135 that is parallel to the stem angle when the product holder 130 is mounted to the stem 124 (see FIG. 3). By varying the stem angles 128, the product angles 135 of corresponding beverage containers 102 are varied to provide a more realistic display.

In various embodiments, the product holder 130 may be permanently mounted to the support 120, or may be temporarily or removably mounted. For example, the illustrated embodiment the product holder 130 is removably mounted to the support 120 (e.g., the stem 124 of the support 120) via cooperating features of the product holder 130 and support 120. The depicted support 120 includes two keyed openings 129. The depicted product holder 130 includes a keyed tab 131 that is sized and shaped to be securably accepted by one of the keyed openings 129. The shape of the keyed opening 129 and keyed tab 131 cooperate to position the product holder 130 at a predetermined orientation to the stem 124 (e.g., parallel to or oriented in a common direction). The keyed openings 129 as seen in FIGS. 5 and 7 are located at different heights along the stem 124, allowing for the product holder 130 to be placed at different elevations.

Figure 9:
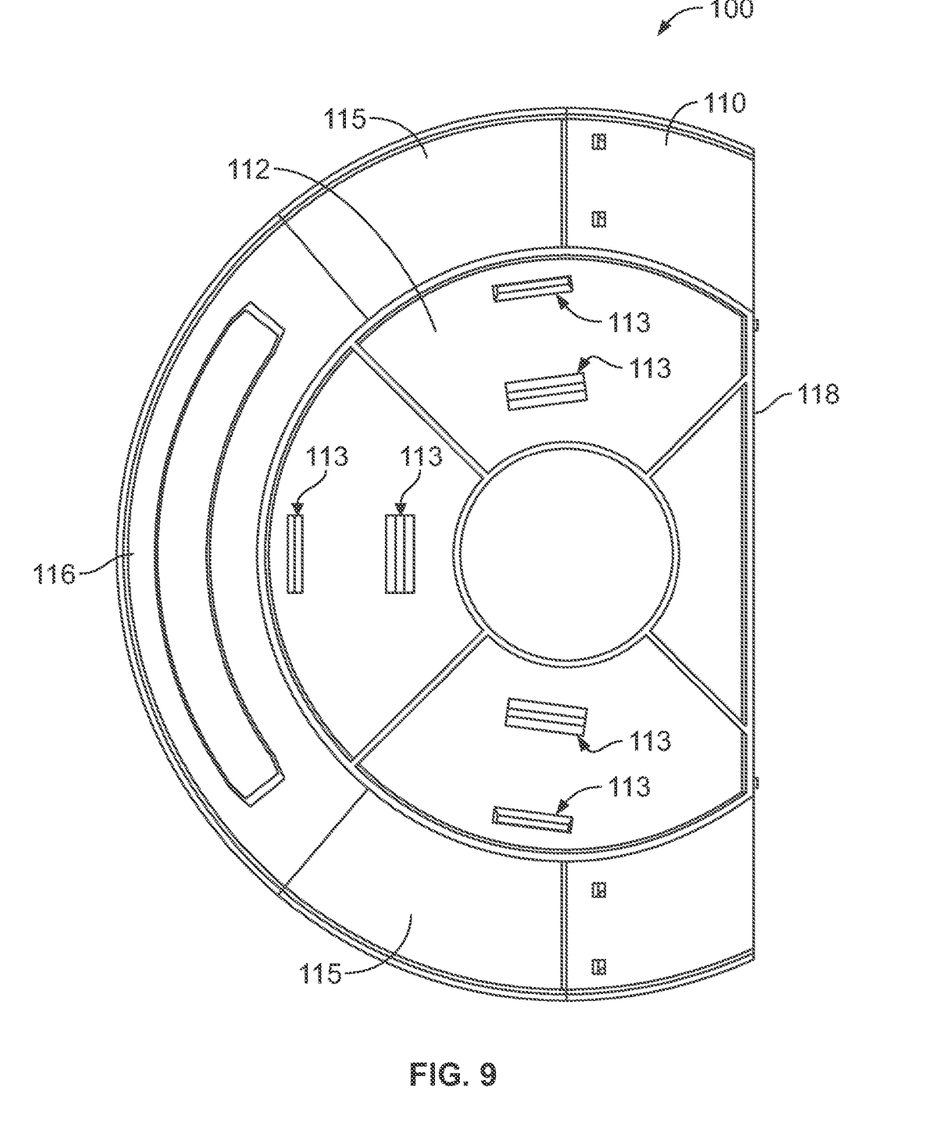
FIG. 9 illustrates a bottom view of the product display assembly of FIG. 1.

FIG. 9 illustrates a bottom view of the product display assembly of FIG. 1. As seen in FIG. 9, the base 112 includes slots 113 that pass therethrough. In the illustrated embodiment, the base 112 includes 3 pairs of slots 113, with each pair of slots 113 used to mount a given support 120. As seen in FIGS. 5 and 7, the foot 122 of the depicted support 120 includes tabs 123. The tabs 123 are accepted by slots 113 of base 112 to secure and orient the supports 120 in place. In various embodiments, the tabs 123 are removably securable (e.g., snapably secured) to the base 112 via the slots 113.

In various embodiments, the product display assembly 100 is configured to appear as a bucket within which the beverage containers 102 are disposed. Further, the product display assembly 100 in various embodiments includes a simulated ice portion 140 (see, e.g., FIGS. 1 and 2) to further enhance the appearance of the display. The simulated ice portion 140, for example, may be molded from a transparent or translucent plastic including block-like sections or projections to simulate a number of ice cubes. As seen in FIG. 1, in the illustrated embodiment, the simulated ice portion 140 is mounted to an upper portion 114 of the body 110, and extends from the interior volume 111, with the simulated ice portion 140 visible to an observer viewing the product display assembly 100 from the side. The simulated ice portion 140 may be secured to the upper portion 114, for example, via a ledge or other structure or feature used to position and/or support the simulated ice portion 140 with respect to the body 110. As another example, additionally or alternatively, the simulated ice portion 140 may be secured to the upper portion 114 with fasteners and/or a snapping connection.

Further, as seen in FIGS. 1 and 2, the depicted simulated ice portion 140 includes an opening 142 passing therethrough. The opening 142 is configured to allow at least one product (e.g., beverage container 102) held by at least one product holder 130 to extend through the opening 142. In the illustrated embodiment, the opening 142 includes 3 portions 143, with each portion 143 configured to allow passage of a beverage container 102. Accordingly, the beverage containers 102, which extend out of the interior volume 111 through the simulated ice portion 140, appear to have been placed in ice. The opening 142 of the simulated ice portion 140 may be sized and configured to cooperate with other aspects of the product display system 100 so that the beverage containers 102 extend through the opening 142. For example, the stem angle 128 of each support 120 may be configured to orient the beverage can 102 held by the product holder 130 to extend through the opening 142. In some embodiments, the simulated ice portion 140 may be removable. Accordingly, the simulated ice portion 140 may be removed from the body 110 during installation of beverage cans 102 in product holders 130, and/or during removal of beverage cans 102 from product holders 130, with the simulated ice portion 140 re-secured to the body 110 after the beverage cans 102 are in place.

In various embodiments, one or more locations may be utilized to display a logo, advertisement, pricing information, and/or other text or images. For example, one or more exterior portions of the body 110 may be used to display text and/or images. Additionally or alternatively, a display member 150 may be employed. In the depicted embodiment, as best seen in FIGS. 1 and 2, the product display assembly 100 includes a display member 150 that is mounted to the simulated ice portion 140, with the display member 150 extending above the upper portion 114 of the body, providing for visibility of any text or images displayed on the display member 150. For example, the display member 150 may include a bottom surface accepted by one or more slots of the simulated ice portion 140, or may include one or more tabs accepted by corresponding slots of the simulated ice portion 140.

In some embodiments, the body 110 may include one or more removable or separable portions from the remainder of the body 110 to facilitate easier placement and/or removal of the beverage containers 102 within the product holders 130. For example, in the illustrated embodiment, the body 110 includes a front portion 116 and a rear portion 118 removable joined together. For example, in some embodiments, the front portion 116 includes tabs 117 removably accepted by slots 119 of the rear portion 118 to removably secure the front portion 116 to the rear portion 118. The base 112 may be formed integrally with the rear portion 118 or otherwise secured to the rear portion 118, so that the front portion 116 may be removed from the rear portion 118 (and separated from the base 110 and rear portion 118) to allow for easy access, for example, to place beverage containers 102 within product holders 130, or, as another example, to secure product holders 130 to supports 120, or, as one more example, to secure supports 120 to the base 112.

Figure 10:
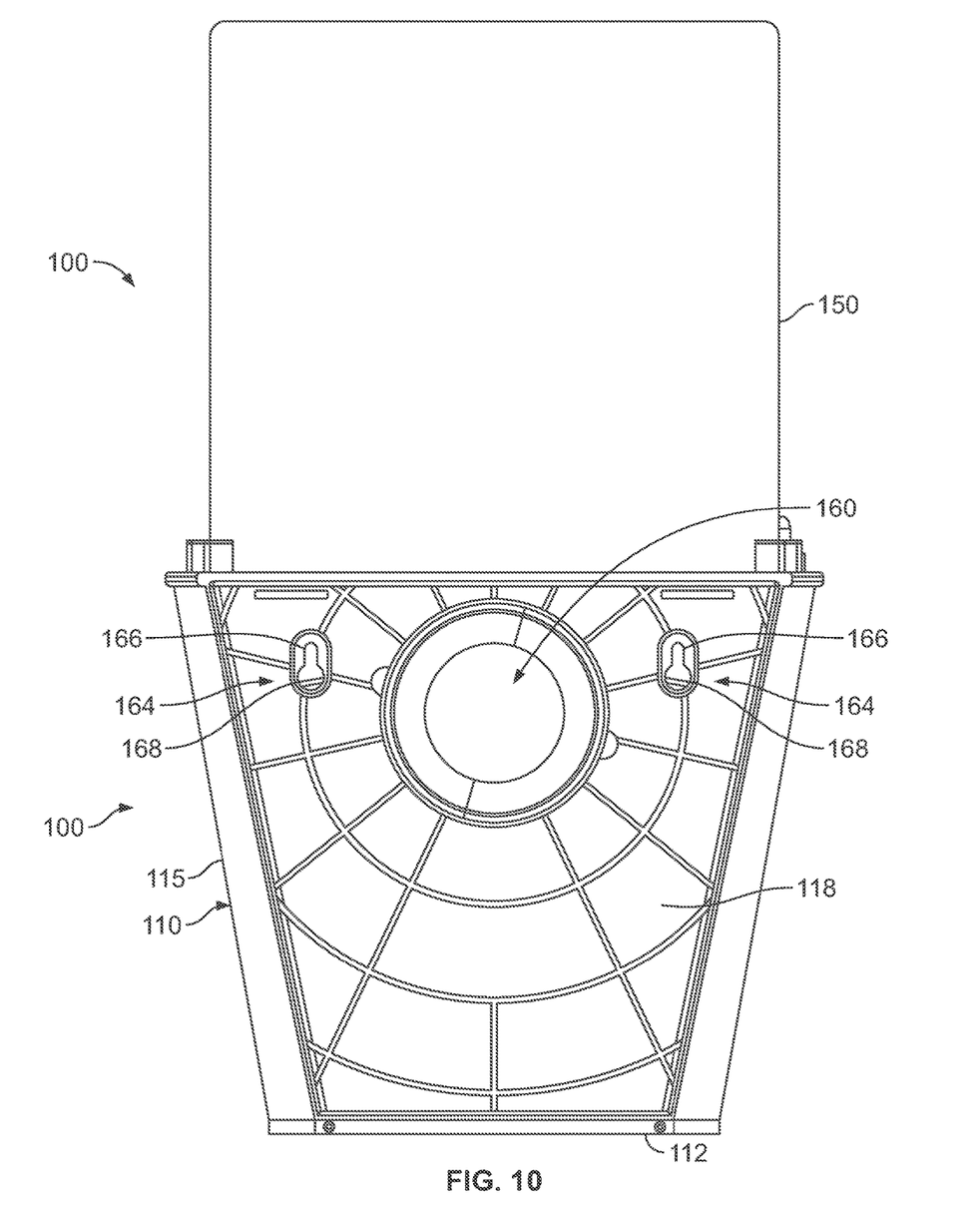
FIG. 10 illustrates a rear view of the product display assembly of FIG. 1.

In various embodiments, the body 110 and/or other aspect of the product display system 100 may include one or more features configured to secure or mount the body 110 in place, for example, for display in a store. FIG. 10 illustrates a rear view of the product display assembly of 100. As seen in FIG. 10, the body 110 includes a rear portion 118 that is configured to accept a mounting suction cup. For example, the depicted body 110 includes an opening 160 passing through the rear portion 116 that is configured to accept a mounting suction cup. Additional details regarding suction cubs may be found in U.S. patent application Ser. No. 14/623,679, filed Feb. 17, 2015, the subject matter of which is hereby incorporated by reference in its entirety.

As also seen in FIG. 10, the depicted rear portion 116 also includes openings 164 configured for mounting the body. The openings 164 include a keyhole shape with an upper portion 166, and a lower portion 168. The upper portion 166 is narrower and generally slot-like, and the lower portion 168 is generally circular and wider than the upper portion 166. A post or other protrusion joined to a shelf or other structure may be accepted by the lower portion 168 with a relatively large amount of clearance for easy insertion of the post or other protrusion, with the body 110 then slide downward to secure the post or other protrusion more securely in the upper portion 166. It may be noted that the depicted rear portion 116 includes openings for using a suction cup as well as openings that accept a post, allowing the depicted product display assembly 100 to be mounted in a variety of situations, including mounting to a glass surface (e.g., via suction cup), or mounting to screws or posts protruding from a shelf or wall (e.g., via openings 164). In other embodiments, the rear portion 116 may be configured for mounting via only a suction cup, or as another example, only via posts.

Figure 11:
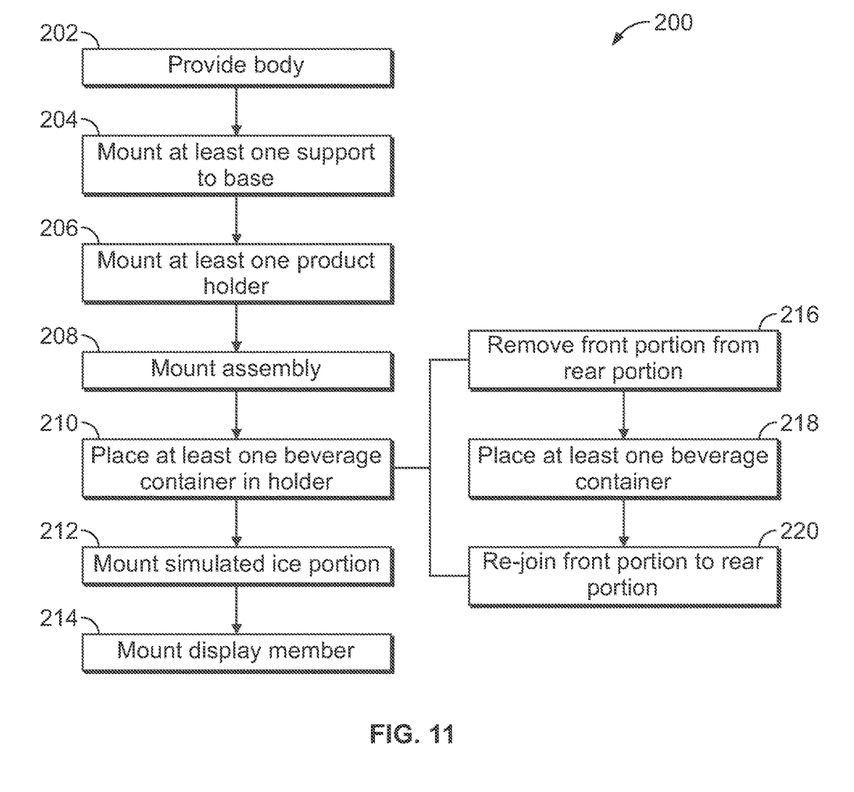
FIG. 11 illustrates a flow chart of a method of displaying products within a product display assembly, according to an embodiment of the present disclosure.

FIG. 11 illustrates a flow chart of a method 200 of providing a product display assembly (e.g., product display assembly 100), according to an embodiment of the present disclosure. It may be noted that various steps may be omitted, combined with other steps, performed more than once, and/or performed in different orders in various embodiments.

The method begins at 202, at which a body (e.g., body 100) is provided. The body defines an interior volume and includes a base. The body may include one or molded plastic portions, and may be shaped to simulate a bucket or other container or receptacle. In some embodiments, the body is formed of several portions that may be non-destructively separated and re-joined to each other (e.g., via tabs and slots).

At 204, at least one support (e.g., support 120) is mounted to the base. For example, one or more tabs of the support may be accepted by one or more slots of the base. The support includes a foot and a stem. The foot defines a foot plane (e.g., a plane extending along a flat upper surface of the base to which the foot is mounted), with the stem extending from the foot at an oblique angle to the foot plane. For example, the stem may define a stem angle that extends from the foot plane within a range of 60-85 degrees. In some embodiments, plural supports are mounted to the base. The supports may have different stem angles in various embodiments.

At 206, at least one product holder (e.g., product holder 130) is mounted to the at least one support. For example, a keyed tab of the product holder may be releasably secured to a keyed opening of the stem of the support to secure the product holder at a predetermined orientation relative to the stem. The product holder is configured to hold a product (e.g., beverage container 102) at an orientation that is oblique to the foot plane (and oblique to the base). In various embodiments, the product holder may include resiliently biasable arms or sides that accept various sizes of beverage containers, and/or may grip a given beverage containers at different locations to position the beverage containers at variable elevations. It may be noted that, in some embodiments, plural product holders are utilized. For example, a number of product holders may be mounted to corresponding supports that have been mounted to the base. The use of plural product holders, for example, in connection with supports that have different stem angles, allows for a number of beverage containers to be placed at different orientations and/or different heights, allowing for a realistic simulation of beverage containers in an actual bucket.

At 208, the assembly is mounted. For example, the assembly may be mounted at a store or other point of sale. In some embodiments, the assembly may be mounted via a suction cup (e.g., to a glass surface such as a display window). In other embodiments, the assembly may be mounted to a post or other protrusion from a shelf or wall.

At 210, at least one beverage container is placed in at least one product holder. In embodiments with multiple holders and supports, multiple beverage containers may be placed within the product display assembly. The use of separate holders and supports allows for flexibility and variety in mounting orientations, allowing, for example, for a realistic simulation of the placement of beverage containers in an actual bucket of ice.

In various embodiments, one or more portions of the product display assembly may be removed and/or dis-assembled for convenient placement of the at least one beverage container in the at least one product holder. For example, in the illustrated embodiment, the body includes a front portion and a rear portion that are removably joined together. At 216, the front portion is removed from the rear portion. At 218, the at least one beverage container is placed in the at least one product holder while the front portion remains removed. At 220, with the beverage container(s) in place as desired in the product holder(s), the front portion is re-joined to the rear portion. It may further be noted that other aspects or portions of the product display assembly may be dis-assembled or removed to provide for easier placement of beverage containers in the product holders. For example, in embodiments utilizing a simulated ice portion, the simulated ice portion may be removed for easier placement and/or removal of beverage containers, and subsequently replaced.

At 212, a simulated ice portion (e.g., simulated ice portion 140) is mounted to an upper portion of the body. The simulated ice portion extends from the interior volume. Accordingly an observer viewing the product display assembly from the side can see the simulated ice portion, which appears as ice that is piled inside a bucket. The simulated ice portion may be mounted to the body, for example, via a ledge extending around an interior perimeter of the body near an upper edge of the body that supports the simulated ice portion. The simulated ice portion may also be secured between two portions of the body (e.g., rear portion 118 and front portion 116 that are snapped or otherwise secured together). Additionally, or alternatively, the simulated ice portion may be mounted to the body via cooperating features on the simulated ice portion and body (e.g., slots and tabs), and/or fasteners. In various embodiments, at least a portion of the beverage container(s) extends above the upper portion of the body (and above the simulated ice portion) when the beverage container is placed in the product holder.

At 214 of the depicted embodiment, a display member (e.g., display member 150) is mounted to the simulated ice portion. The display member extends above the upper portion of the body. In various embodiments, the display member may be mounted to the simulated portion by inserting a bottom surface of the display member into one or more slots of the simulated ice portion 140, or, as another example, may be mounted via tabs and slots to the simulated ice portion 140.

Referring to FIGS. 1-11, embodiments of the present disclosure provide a product display assembly that allows for display one or more products. Product display assemblies as discussed herein provide for the use of one more concealed holders within an interior volume that hold beverage containers that extend beyond the interior volume. Product display assemblies as discussed herein provide for mounting of beverage containers at different orientations, for example to realistically simulate the appearance of beverage containers in a bucket of ice.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A product display assembly configured to display beverage containers, the assembly comprising:
a body defining an interior volume, the body comprising a base;
at least one support mounted to the base of the body, the support disposed within the interior volume, the support comprising a foot and a stem extending from the foot, wherein the foot is mounted to the base of the body and defines a foot plane, the stem extending from the foot at an oblique angle to the foot plane;
at least one product holder mounted to the at least one support, the product holder configured to hold a product at an orientation that is oblique to the foot plane; and
a simulated ice portion mounted to an upper portion of the body, the simulated ice portion extending from the interior volume.

2. The product display assembly of claim 1, further comprising multiple supports mounted to the base.

3. The product display assembly of claim 2, each support defining a stem angle extending from the foot plane, wherein at least two of the supports define different stem angles from each other.

4. The product display assembly of claim 1, wherein the stem defines a stem angle at which the stem extends from the foot plane, and wherein the at least one product holder defines a product angle that is parallel to the stem angle when the product holder is mounted to the stem.

5. The product display assembly of claim 1, wherein the simulated ice portion comprises an opening configured to allow the product held by the product holder to extend through the opening.

6. The product display assembly of claim 5, wherein the stem defines a stem angle at which the stem extends from the foot plane, the stem angle configured to orient the product held by the product holder to extend through the opening of the simulated ice portion.

7. The product display assembly of claim 5, further comprising a display member mounted to the simulated ice portion, the display member extending above the upper portion of the body.

8. The product display assembly of claim 1, wherein the body comprises a front portion and a rear portion removably joined together.

9. The product display assembly of claim 1, wherein the body comprises a rear portion configured to accept a mounting suction cup.

10. The product display assembly of claim 1, wherein the body comprises a rear portion including openings configured for mounting the body.

11. A product display assembly configured to display beverage containers, the assembly comprising:
- a support configured to be mounted within an internal volume of a body, the support comprising a foot and a stem extending from the foot, wherein the foot defines a foot plane, the stem extending from the foot at an oblique angle to the foot plane;
- a product holder removably mounted to the stem, the product holder configured to hold a product at an orientation that is oblique to the foot plane; and
- a simulated ice portion mounted to an upper portion of the body, the simulated ice portion extending from the interior volume.

12. The product display assembly of claim 11, wherein the stem defines a stem angle at which the stem extends from the foot plane, and wherein the product holder defines a product angle that is parallel to the stem angle when the product holder is mounted to the stem.

13. The product display assembly of claim 12, wherein the stem comprises a keyed opening and the product holder comprises a keyed projection configured to be accepted by the keyed opening to mount the product holder to the stem.

14. A method comprising:
- providing a body defining an interior volume, the body comprising a base;
- mounting at least one support to the base of the body, the support disposed within the interior volume, the support comprising a foot and a stem extending from the foot, the foot defining a foot plane, the stem extending from the foot at an oblique angle to the foot plane;
- mounting at least one product holder to the at least one support, the product holder configured to hold a product at an orientation that is oblique to the foot plane; and
- mounting a simulated ice portion to an upper portion of the body, the simulated ice portion extending from the interior volume.

15. The method of claim 14, comprising mounting plural supports to the base and mounting plural product holders to corresponding supports.

16. The method of claim 14, further comprising positioning at least one beverage container within at least one product holder wherein a portion of the beverage container extends through an opening of the product holder.

17. The method of claim 14, further comprising mounting a display member to the simulated ice portion, the display member extending above the upper portion of the body.

18. The method of claim 14, wherein the body comprises a front portion and a rear portion removably joined together, the method comprising removing the front portion from the rear portion, placing at least one beverage container in the at least one product holder with the front portion removed, and re-joining the front portion to the rear portion after placing the at least one beverage container.

* * * * *